V. LINK.
CENTRIFUGAL GOVERNOR.
APPLICATION FILED JUNE 9, 1908.

1,041,643.

Patented Oct. 15, 1912.

Witnesses
J. G. Hinkel
J. J. McCarthy

Inventor
Vincent Link
By Foster, Freeman, Watson & Cait
Attorneys

UNITED STATES PATENT OFFICE.

VINCENT LINK, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

CENTRIFUGAL GOVERNOR.

1,041,643.   Specification of Letters Patent.   Patented Oct. 15, 1912.

Application filed June 9, 1908. Serial No. 437,589.

*To all whom it may concern:*

Be it known that I, VINCENT LINK, a citizen of the United States, residing at Detroit, in the county of Wayne and State of Michigan, have invented certain new and useful Improvements in Centrifugal Governors, of which the following is a specification.

This invention relates to centrifugal governors, and is particularly adapted for use with hydrocarbon motors for regulating the supply of combustible mixture, and for advancing and retarding the spark apparatus. Its novel features will be understood from the following description.

Figure 1:
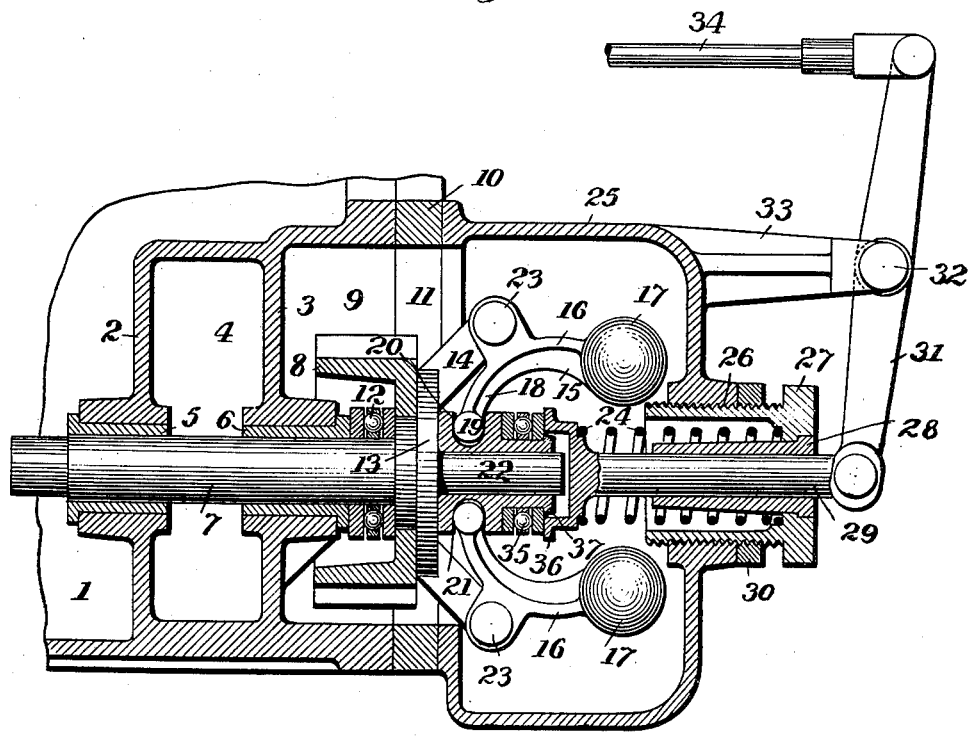
Figure 2:
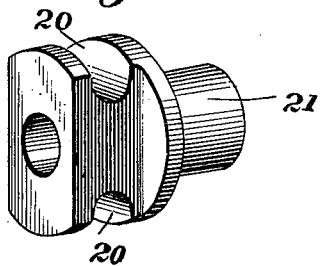

In the accompanying drawings,—Figure 1 is a horizontal section through a governor embodying my invention applied to the front end of the crank case of a hydrocarbon motor; and Fig. 2 is a detail perspective view of one of the elements of the apparatus.

In the drawing 1 represents a portion of the crank case having spaced walls 2 and 3 between which is a passage 4 which communicates with the interior of the crank case so that oil may be supplied by the splash system to the bearings 5 and 6 for the magneto shaft 7. The shaft 7 is driven by the motor through suitable gearing, one of the gears 8 being shown in the forward gear compartment 9 formed in the front of the crank case, the said gear 8 being rigidly secured to the shaft 7 in any suitable manner. This compartment 9 may be supplied with lubricant independently of the splash system, which supplies the bearings in the crank case. The front cover 10 of the gear case 9 is provided with an opening 11 surrounding the end of the shaft 7 and the gear 8.

Surrounding the shaft 7 and between the bushing of the bearing 6 and the web of the gear 8 there is placed a ball thrust bearing 12 to lessen the friction due to the thrusts imposed upon the shaft by the governor mechanism hereafter described. A circumferential abutment or disk 13 is secured or fixed to the forward side of the web of the gear 8, and consequently to the shaft 7, and is provided with oppositely disposed and forwardly extending arms 14 at the outer extremities of which are pivotally mounted the governor levers 15. These levers have outwardly extending arms 16 terminating in the weights or balls 17, and inwardly extending arms 18 having transversely arranged cylindrical ends 19 which are adapted to work loosely in the transverse grooves 20 formed in a rotatable and longitudinally movable block 21. This block 21 is loosely mounted on the end 22 of the shaft 7 and turns with that shaft by reason of the engagement of the ends 19 of the arms 15 with the transverse grooves therein. It will be understood that the arms 15 being pivoted at 23 will be made to turn on their pivots by reason of the centrifugal action of the weights 17 when the shaft is rotated rapidly, and that consequently the ends 19 of these arms will move the block 21 longitudinally of the end 22 of shaft 7. In one direction this longitudinal movement is resisted by a spring 24.

A supplemental casing 25 is secured to the main casing of the gear chamber around the opening 11, and this supplemental casing surrounds and protects the parts of the governor which project through the wall of the gear case. This supplemental casing is like the main casing preferably formed of aluminum, and it is secured to the main casing by any suitable means. This casing 25 is provided with an opening 26 substantially in line with the end of the shaft 7 and there is a collar 27 screwed into this opening. A bushing 28 fits in the central opening in this collar and furnishes a bearing for the reciprocating rod 29. A lock nut 30 is provided on the collar 27 to secure it in adjusted position within the opening 26. The reciprocating rod 29 is connected with one end of the lever 31 pivoted at 32 to an arm 33 extending from the casing 25, and the opposite end of this lever 31 is connected to a rod 34 which controls the motor throttle and spark mechanism, as is well known.

The inner end of the reciprocating rod 29 is enlarged and made cup-shaped so as to embrace the end of the part 23 and to bear against the block 21 through the ball thrust bearing 35. This ball thrust bearing 35 surrounds the reduced end of the block 21, and it will be observed that by reason of the form of this bearing and the form of the cup-shaped end of the rod 29 provided with a flange 36, it is not absolutely necessary that the shaft 7 and the rod 9 be in exact alinement, since there may be considerable variation without affecting the action of the parts. The spring 24 bears against the rear side of the cup-shaped end of the shaft 29 and against a shoulder on the interior of the sleeve 27, and it will be observed that this spring tends to force the block 21 against the disk 13, thus holding the weighted governor arms in the position shown in Fig. 1, and it is only when the centrifugal action of the governor arms overcomes the tension of this spring that the block 21 will be moved forward, turning the lever 31 on its pivot, and thus operating the rod 34. It will thus be seen that the rod 29 is moved in one direction only by the block 21, and is constructed for free movement away from said block. By means of this construction the rod 34 may be independently operated to close the throttle, if so desired, without moving the block 21 and the balls 17. It will be noted that the ball thrust bearing 35 is retained loosely on the block 21 by the lip 37 formed by upsetting the edge of the block.

The particular form of block 21 is clearly shown in Fig. 2, and it will be observed that by its structure and the arrangement of the parts, all of the parts of the governor rotate together while the non-rotating operating rod 29 has the movement of the block 21 conveyed to it through a thrust bearing, thus reducing the friction to a minimum. It will also be noted that the casing 25, together with the rod 29 and other attached parts may be bodily removed from the governor mechanism itself, and that the latter may be easily and conveniently inspected and cleaned.

Having thus described the invention, what is claimed is:

1. In a centrifugal governor, the combination with a rotary shaft, of a block mounted to slide longitudinally on the end of said shaft, a circumferential fixed abutment on said shaft, movable weights carried thereby and engaging said block to move it, a longitudinally movable rod mounted in substantial alinement with the shaft and provided with a cup-shaped end surrounding and spaced from said shaft and bearing against said block, a spring surrounding said rod tending to force it against said block, and a thrust bearing carried on the end of said block against which the cup-shaped end of the rod bears.

2. In a device of the class described, the combination with a main casing, of a rotary shaft mounted therein and extending to an opening in the wall thereof, of a centrifugal governor mounted on the end of said shaft having a longitudinally movable portion, a supplemental casing surrounding the governor mechanism and closing the opening in the main casing, the said supplemental casing being provided with an opening in substantial alinement with the end of the shaft, an adjustable bushing in said opening, a sliding rod mounted in said bushing and bearing at its inner end against the longitudinally movable portion of the governor, and a coiled spring surrounding said rod and bearing against said bushing and tending to force it against the governor.

3. In a device of the class described, a block having a longitudinal bore and provided with transverse grooves for engagement with governor arms and provided with a reduced cylindrical end having thereon rotary rings with a ball bearing between them, the said cylindrical portion having an end flange for retaining the rings thereon.

4. In a device of the class described, the combination with a gear case, of a rotary shaft in line with an opening in said case, a centrifugal governor mounted on the end of said shaft embodying a longitudinally movable block, a ball thrust bearing secured on the end of said block, a supplemental casing detachably secured around the opening in the gear case and surrounding said governor, a longitudinally movable rod in said supplemental casing in line with and spaced from said shaft and having a bearing surface adapted to engage said thrust bearing, and actuating mechanism secured to said rod.

5. In a device of the class described, the combination with a gear case, of a rotary shaft in line with an opening in said case, a centrifugal governor mounted on the end of said shaft embodying a longitudinally movable block, a ball thrust bearing secured on the end of said block, a supplemental casing detachably secured around the opening in the gear case and surrounding said governor, a longitudinally movable rod carried by said supplemental casing in line with and spaced from said shaft and having a bearing surface adapted to engage said thrust bearing, a spring in said casing tending to force said rod toward said governor, and actuating mechanism secured to said rod.

6. In a device of the class described, the combination with governor mechanism including a movable member, of a casing inclosing said member, an endwise movable shaft provided with an enlarged head in engagement with the movable member, a bearing sleeve for the shaft of greater diameter than the head, detachably secured to the casing and provided with an internal shoulder, and a spring on the shaft between the head and shoulder.

7. In a device of the class described, in combination, a governor mechanism including an endwise movable and rotatable member, and an endwise movable operating shaft abutting the endwise movable and rotatable member, the abutting surfaces being constructed to permit the member and shaft to be located out of alinement.

8. In a device of the class described, in combination, a governor mechanism including an endwise movable and rotatable shaft, and an endwise movable and non-rotatable operating shaft having a cup-shaped head abutting the first shaft, the abutting surfaces being constructed to permit the shafts to be located out of alinement.

In testimony whereof I affix my signature in presence of two witnesses.

VINCENT LINK.

Witnesses:
　CLARA I. DALE,
　HOWARD HARKNESS.